US000001308H

United States Statutory Invention Registration [19]

[11] Reg. Number: H1308

Winbow et al.

[43] Published: May 3, 1994

[54] NARROW BAND ACOUSTIC SOURCE

[75] Inventors: Graham A. Winbow, Houston; Sen T. Chen, Sugarland, both of Tex.

[73] Assignee: Exxon Production Research Company, Houston, Tex.

[21] Appl. No.: 950,119

[22] Filed: Sep. 23, 1992

[51] Int. Cl.[5] ..... H04R 15/00

[52] U.S. Cl. ..... 367/157; 367/158; 367/159; 367/162; 367/176; 310/337; 181/106

[58] Field of Search ..... 367/157, 158, 159, 141, 367/162, 176; 310/337; 181/106, 110

[56] References Cited

U.S. PATENT DOCUMENTS

| | | | |
|---|---|---|---|
| 4,525,645 | 6/1985 | Shirley et al. | 310/337 |
| 4,671,379 | 6/1987 | Kennedy et al. | 181/106 |
| 4,682,308 | 7/1987 | Chung | 367/31 |
| 4,821,244 | 4/1989 | Wood | 367/159 |
| 4,855,964 | 8/1989 | Fanning et al. | 367/159 |
| 5,030,873 | 7/1991 | Owen | 310/337 |
| 5,081,391 | 1/1992 | Owen | 310/334 |

*Primary Examiner*—J. Woodrow Eldred

[57] ABSTRACT

A seismic source for downhole use is disclosed which is formed by an outer tubular member having weighted ends which carries within a coaxially mounted tubularly shaped piezoelectric element. The piezoelectric element is cyclically driven to produce a standing wave having a frequency in the range of 0.25 to 5 kHz and a narrow bandwidth in the range of 5–50 Hz.

16 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NARROW BAND ACOUSTIC SOURCE

BACKGROUND OF THE INVENTION

1. Field of the Invention

This invention relates to a narrow band acoustic source, and a method for constructing and using said source.

2. Description of the Related Art

High frequency acoustic sources have been used to obtain good resolution of geologic features during logging operations. Conventional acoustic sources used in well logging generate signals having frequencies in the range of 5 kHZ to 25 kHz. These sources provide vertical resolution of features on the order of 2–5 ft. (0.6 m–1.5 m). However, penetration of the surrounding formation is severely limited, reaching only approximately 10 feet (3 m) beyond the borehole in which the source is located. The conventional sources thus cannot be used for cross-hole imaging. For cross-hole imaging low frequency signals are usually employed. However, low frequency signals, say, on the order of 100 Hz, do not provide good resolution of features smaller than 20–50 feet. They do however, provide excellent penetration.

One of the limitations on penetration is signal bandwidth. The relationship of the amplitude of the signal at the central frequency, $A(\omega_o)$ to the total power of the device, $P_T$ and the bandwidth of the signal, $2\pi\Gamma$ is shown in Equation (1):

$$|A(\omega_o)|^2 = P_T/2\pi\Gamma \qquad \text{Eq. (1)}$$

The total power, $P_T$, is fixed by the instrumentation and power supply system. Therefore, as bandwidth increases, amplitude decreases. By narrowing the bandwidth, greater amplitude and thus penetration into the formation should be possible. For example reduction in bandwidth from say 10 kHz to 5 Hz, a factor of 2000, would provide an increase of signal level by a factor of $(2000)^{\frac{1}{2}} \approx 45$ at a finite $\Gamma$.

Crosswell signal levels fall roughly as $R^{-2}$ in our experience where R is the range. Thus, we could increase our range by a factor of $(45)^{-2} \approx 6.7$ relative to conventional crosshole devices operating in broadband mode.

SUMMARY OF THE INVENTION

The invention provides an apparatus and method for generating a high amplitude, narrow band, high frequency acoustic signal. Such a signal is useful for crosshole imaging at high resolution.

In one embodiment of the invention, there is provided an apparatus for generating an acoustic signal. A tubularly shaped radially polarized piezoelectric element having a generally cylindrical outer surface is rigidly affixed to an inner surface of a tubular member such that substantially all of the generally cylindrical outer surface of the tubularly shaped radially polarized piezoelectric element is in contact with the inner surface of the tubular member. The tubular member is at least twice as long as the piezoelectric element. The radially polarized piezoelectric element expands or contracts in the radial direction upon electrical excitation. Means for exciting the piezoelectric element is attached to the piezoelectric element. A first end mass is affixed to a first end of the tubular member and a second end mass is affixed to a second end of the tubular member to force radial vibrations of the tubular member.

In another embodiment of the invention, a method for generating an acoustic signal is disclosed. A tubular member is positioned in a fluid. A standing extensional wave is cyclically excited in the tubular member. The standing extensional wave has a frequency which is related to the length of the tubular member by the relation:

$$L = v_e/2F_R$$

where L is the length of the tubular member, as measured between a first end and a second end of the tubular member, $v_e$ is a velocity of extensional waves in the tubular member, and $F_R$ is the resonance frequency. An acoustic signal is thereby emitted from the tubular member.

In another embodiment of the invention, a method of acquiring seismic data is provided. A tubular member is positioned in a fluid-filled wellbore. Said tubular member has a tubularly shaped piezoelectric element rigidly bonded to an inner surface of the tubular member. The length of the tubular member is at least twice the length of the piezoelectric element. A generally cylindrical outer surface of the tubularly shaped piezoelectric element is driven against the inner surface of the tubular member, exciting a standing wave in the tubular member. An acoustic signal is thereby emitted. Said acoustic signal is reflected off an interface in a body of rock surrounding the fluid-filled wellbore and is received at a plurality of seismic receivers.

DETAILED DESCRIPTION OF THE PREFERRED EMBODIMENT

Figure 1:
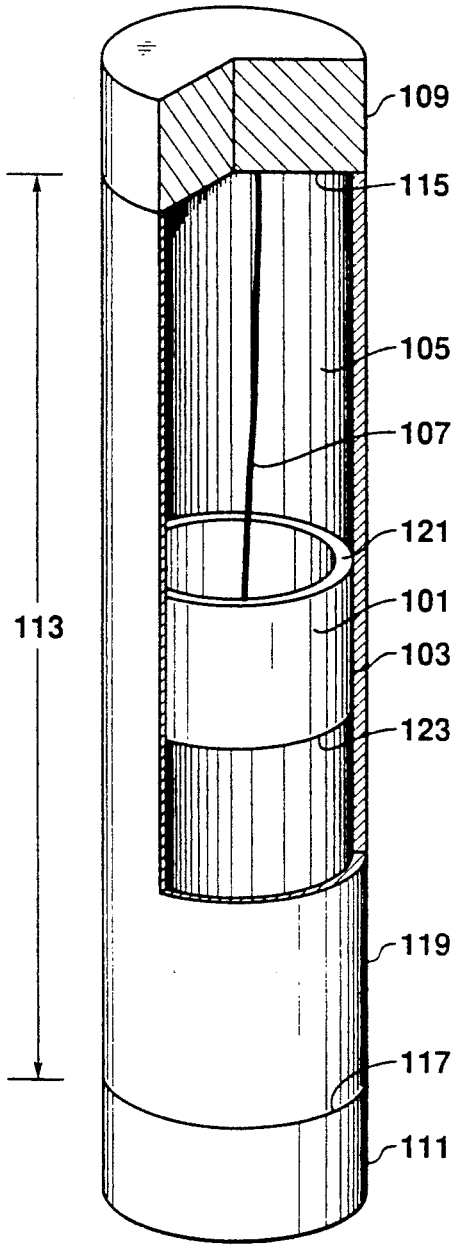
FIG. 1 illustrates an embodiment of the invention with a portion of the housing cut away to show internal details.

In accordance with one embodiment of the present invention, there is provided an apparatus for producing an acoustic signal. At least one tubularly shaped radially polarized piezoelectric element, indicated at 101 in FIG. 1, having a generally cylindrical outer surface, indicated at 103 in FIG. 1, is rigidly bonded to a generally cylindrical inner surface 105 of a tubular member 119, such that an entire circumference of the generally cylindrical outer surface of the tubularly shaped piezoelectric element is in contact with the inner surface of the tubular member. The piezoelectric element expands or contracts in the radial direction when electrically excited. Preferably the piezoelectric element has a hollow cylindrical shape. A means for exciting the piezoelectric hollow cylinder, such as electrical leads indicated at 107 in FIG. 1, is provided. A first mass, indicated at 119, is affixed to a first end of the tubular member indicated at 115 in FIG. 1, and a second mass, indicated at 111, is affixed to a second end of the tubular member, indicated at 117 in FIG. 1. For downhole seismic applications, each end mass should be at least 3 kg, generally in the range of about 3 kg to about 30 kg. Preferably, each end mass will be generally cylindrical in shape and have an outside diameter which is about the same as the outside diameter of the tubular member.

In a preferred embodiment of the invention, the tubular member, indicated at 119 in FIG. 1, has a length, L, indicated at 113 in FIG. 1, and measured in feet between the first end and the second end of the tubular member, which is related to a frequency of an acoustic signal to be produced, $F_R$, by Equation (2):

$$L = v_e / 2F_R \qquad \text{Eq. (2)}$$

in which $v_e$ is a velocity of an extensional wave in the tubular member in feet per second. Preferably, $F_R$ is in the range of 500 to 2000 Hz. In one exemplary embodiment of the invention, the tubular member is comprised of steel and has a length, L, as indicated at 113 in FIG. 1, between approximately 7 ft (1.1 m) and approximately 10 ft. (3.05 m). In a second exemplary embodiment of the invention, the tubular member is comprised of brass, and has a length, L, as indicated at 113 in FIG. 1 of between approximately 5 ft. (1.5 m) and approximately 7 ft. (2.1 m). In a third exemplary embodiment of the invention, the tubular member is comprised of Lucite plastic, and has a length, L, as indicated 113 in FIG. 1, of between approximately 2.5 ft. (0.76 m) and approximately 4 ft. (1.2 m).

In an embodiment of the invention, the first mass and second mass, indicated 109 in FIG. 1, fastened to the tubular member, indicated at 119 in FIG. 1, along an entire circumference of the first end of the tubular member, indicated at 115 in FIG. 1. The masses can be fastened rigidly by any suitable means to the ends of the tubular member. The first mass and the second mass are preferably affixed to the tubular member using an epoxy adhesive or other cement, so as to form a fluid-tight seal along the intersection of the tubular member with the first and second masses. The masses preferably are of sufficient mass to fix the nodes of a standing wave induced in the tubular member, generally at least 3 kg each.

In a preferred embodiment of the invention, the means for exciting the piezoelectric hollow cylinder, indicated at 107 in FIG. 1, comprises electrical leads attached to the piezoelectric element, said electrical leads being connected to a downhole capacitor discharge bank, such as is known in the art. Electrical power may be supplied via standard 7-conductor wireline cable from a source on the surface of the earth. This embodiment is illustrated by source 450 shown in FIG. 2. Since the source could be driven with a power supply of 200–400 watts via 7-conductor cable, a 60 second burst should deliver the order of 20 kj of electrical input energy which should suffice for strong crosshole signals.

In a further preferred embodiment of the invention, the tubularly shaped piezoelectric element is spaced apart from the first end of the tubular member, indicated at 115 in FIG. 1, and from the second end of the tubular member, indicated at 117 in FIG. 1, and is securely affixed to the inner surface of the tubular member at a location equidistant from the first end and from the second end of the tubular member. The piezoelectric element used may be an approximately 3" high PZT cylinder such as is generally commercially available. An epoxy or other cement may be used to bond the piezoelectric element to the tubular member.

In accordance with another embodiment of the invention, a method of constructing an acoustic source is provided. This method comprises securely fastening the tubularly shaped piezoelectric element having a generally cylindrical outer surface, to an inner surface of a tubular member such that substantially all of the generally cylindrical outer surface of the tubularly shaped piezoelectric element is in contact with the inner surface of the tubular member. The method further comprises connecting a means for exciting the tubularly shaped piezoelectric element to said tubularly shaped piezoelectric element. A first mass is fastened to a first end of the tubular member such that an outer surface of the first mass is in contact with the tubular member along substantially an entire circumference of the tubular member and a second mass is affixed to a second end of the tubular member such than an outer surface of the second mass is in contact with the tubular member along substantially an entire circumference of the tubular member.

Figure 2:
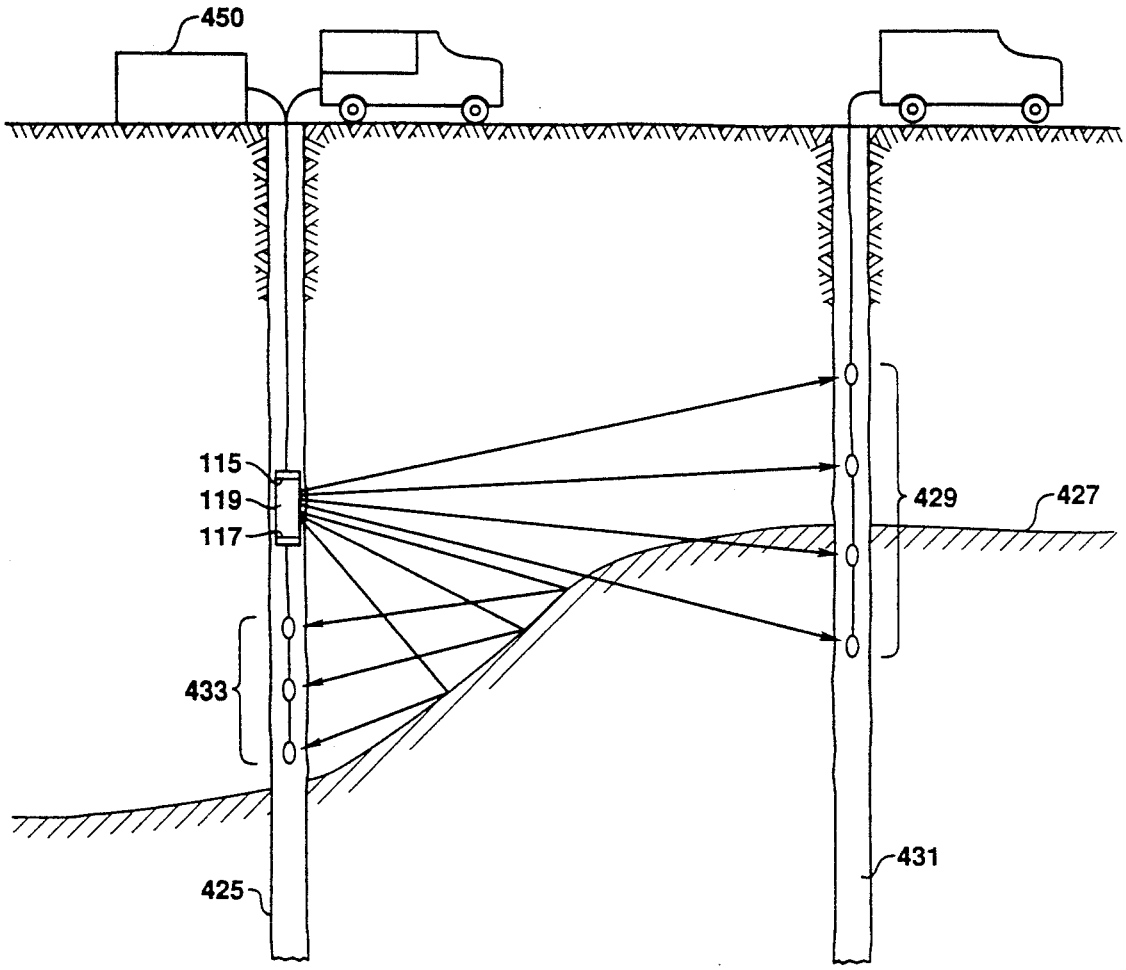
FIG. 2 pictorially illustrates the practice of an embodiment of the invention.

In another embodiment of the invention, a method of generating an acoustic signal is provided comprising positioning a tubular member, indicated at 119 in FIGS. 1 and 2, in a fluid, said tubular member having a first end, indicated at 115 in FIGS. 1 and 2, and a second end, indicated at 117 in FIGS. 1 and 2 and containing a piezoelectric element 101 between the first end and the second end. The outer surface of the tubularly shaped piezoelectric element, is cyclically driven radially outward against an inner surface of the tubular member, indicated at 105 in FIG. 1, said outer surface being rigidly bonded to said inner surface, to produce a standing wave in the tubular member. A set of piezoelectric cylinders bonded near the center of the cylinder could be used to excite a standing extensional wave resonance of the cylinder. A first node of the standing wave is fixed by a first mass, indicated at 109 in FIG. 1, affixed to the first end of the tubular member, indicated at 115, and a second node of the standing wave is fixed by a second mass, indicated at 117 in FIG. 1, affixed to the second end of the tubular member. This standing wave produces an acoustic signal which radiates from the tubular member.

It is preferred that the standing wave produced causes an acoustic signal whose frequency is between approximately 250 Hz and approximately 5 kHz and whose bandwidth is between approximately 5 Hz and approximately 50 Hz. Advantages of a signal of this relatively high frequency are shown in the art. Better vertical resolution will be achieved and less problem with tube waves will occur. It is preferred that acoustic signal have a radiation pattern controlled by a factor f ($\phi$), wherein:

$$f(\phi) = L \sin \phi / \phi$$

L is the length of the tubular member measured in feet and $\phi$ being defined by the relation:

$$\phi = p\, v_e \cos \phi / 2\, v_p$$

$v_e$ is the velocity in feet per second of the standing extensional wave in the tubular member, $v_p$ is the velocity of P-waves in a formation surrounding the fluid in which the tubular member is positioned and through which the acoustic signal will travel and $\phi$ is a colatitude angle between the longitudinal axis of the tubular member and the direction of the radiation. Preferably, the outer surface of the tubularly shaped piezoelectric element, indicated at 103 in FIG. 1, is cyclically driven radially outward against the inner surface of the tubular member for a period of approximately one second, approximately once per minute. However, the invention can also be employed utilizing conventional activators for acoustic sources which typically trigger the source 10–20 times per second. Triggering a source only once per minute can supply approximately 600 times more energy available per pulse. The piezoelectric transducer can be driven by a high voltage pulse (−4000 volts) or a high power sine-wave generator tuned to match the resonance of the system.

Another embodiment of the invention provides a method of acquiring seismic data. The method utilizes the generation of a seismic signal as just described from a first fluid filled wellbore 425. The high frequency, narrow band acoustic signal emitted from the tubular member is then reflected off an interface 427 in a body of rock surrounding the first fluid-filled wellbore, and received at a plurality of seismic receivers 429 and/or 433.

In one embodiment of the invention, the plurality of seismic receivers 429, are positioned in a second fluid-filled wellbore 431 in FIG. 2. In another embodiment of the invention, the plurality of seismic receivers 433 in FIG. 2, are positioned in the same fluid-filled wellbore as the source, indicated at 425 in FIG. 2. The invention would provide an advantage over prior art well logging techniques because of the better penetration of the high-resolution-provding high-frequency acoustic waves. This latter embodiment would lead to enhanced horizontal resolution compared with normal crosswell transmission imaging. In a further embodiment of the invention, the high frequency seismic waves employed have a frequency between approximately 250 Hz and approximately 5 kHz and a bandwidth of between approximately 5 Hz and approximately 50 Hz. Working at a single frequency $f_o$, the data set collected would be of the same size as for travel time tomography. Instead of recording one travel time per source and receiver location we could record one phase shift per source-receiver location. Such a phase shift would be relatively independent of source and receiver coupling and other experimental complications. With a system of the type discussed here we could also record at a small number of additional frequencies, say at 250, 500, 750, and 1000 Hz, thus further enhancing the image.

We claim:

1. An acoustic source comprising:

a. a tubular member having a first end and a second end and a length L as measured between the first end and the second end;

b. a tubularly shaped piezoelectric element having a generally cylindrical outer surface, said tubularly shaped piezoelectric element being located within the tubular member such that the generally cylindrical outer surface of the tubularly shaped piezoelectric element is in contact with an inner surface of the tubular member along an entire circumference of the generally cylindrical outer surface of the tubularly shaped piezoelectric element and said tubularly shaped piezoelectric element is securely fastened to the inner surface of the tubular member, said tubularly shaped piezoelectric element having a length l which is in the range of 0.05 L to 0.5 L;

c. a means for electrically exciting the piezoelectric element operatively associated with said piezoelectric element;

d. a first end mass fastened rigidly to the first end of the tubular member; and e. a second end mass fastened rigidly to a second end of the tubular member.

2. An acoustic source, as recited in claim 1, wherein the tubular member has a length, L, measured in feet between the first end and the second end which is related to a frequency of an acoustic signal to be produced, $F_R$, measured in cycles per second by the relation:

$$L = v_e/2F_R$$

in which $v_e$ is the velocity of an extensional wave in the tubular member, $v_e$ being measured in feet per second.

3. An acoustic source, as recited in claim 2, wherein each of the first end mass and the second end mass comprises a cylinder having a mass in the range of 3–30 kg.

4. An acoustic source, as recited in claim 1, wherein the tubular member is comprised of steel and has a length of between approximately 7 ft. (2.1 m.) and approximately 10 ft. (3.05 m.), as measured between the first end and the second end of the tubular member.

5. An acoustic source, as recited in claim 1, wherein the tubular member is comprised of brass and has a length of between approximately 5 ft. (1.5 m.) and approximately 7 ft. (2.1 m.), as measured between the first end and the second end of the tubular member.

6. An acoustic source, as recited claim 1, wherein the tubular member is comprised of Lucite plastic and has a length of between approximately 2.5 ft. (0.76 m.) and approximately 4 ft. (1.2 m.), as measured between the first end and the second end of the tubular member.

7. An acoustic source, as recited in claim 1, wherein the tubularly shaped piezoelectric element is securely fastened to the inner surface of the tubular member at a location spaced apart from and equidistant from the first end and from the second end of the tubular member.

8. A method of generating an acoustic signal, said method comprising:

a. positioning a tubular member in a fluid, said tubular member having a first end and a second end;

b. cyclically exciting a standing extensional wave having a resonance frequency $F_R$ in the tubular member, the resonance frequency of the standing extensional wave being related to a length of the tubular member by the relation:

$$L = v_e/2F_R$$

where L is the length of the tubular member in feet, as measured between the first end and the second end, $v_e$ is a velocity of the standing extensional wave in the tubular member, $v_e$ being measured in feet per second, and $F_R$ is the resonance frequency in Hz; and c. emitting an acoustic signal from the tubular member.

9. A method as recited in claim 8, wherein the acoustic signal has a frequency between approximately 250 Hz and approximately 5 khz and a bandwidth between approximately 5 Hz and approximately 50 Hz, said acoustic signal having a radiation pattern controlled by a factor $f(\phi)$, wherein:

$$f(\phi) = L \sin \phi/\phi$$

L being the length of the tubular member measured in feet and $\phi$ being defined by the relation:

$$\phi = p\ v_e \cos \phi/2\ v_p$$

$v_e$ being the velocity in feet per second of the standing extensional wave in the tubular member, $v_p$ being the velocity of P-waves in a formation surrounding the fluid in which the tubular member is positioned and through which the acoustic signal will travel, and $\phi$ is a colatitude angle between the longitudinal axis of the tubular member and the direction of the radiation.

10. A method of generating an acoustic signal, as recited in claim 9, wherein the standing extensional wave is cyclically excited in the tubular member by cyclically driving a generally cylindrical outer surface of a tubularly shaped piezoelectric element radially outward against a generally cylindrical inner surface of the tubular member, said outer surface of the tubularly shaped piezoelectric element being securely fastened to an inner surface of the tubular member, a first node of the standing extensional wave being fixed by a first mass affixed to the first end of the tubular member and a second node of the standing extensional wave being fixed by a second mass affixed to the second end of the tubular member.

11. A method of generating an acoustic signal, as recited in claim 9, wherein the outer surface of the tubularly shaped piezoelectric element is cyclically driven radially outward against the inner surface of the tubular member a period of approximately 0.5 ms approximately twenty times per second.

12. A method of acquiring seismic data, said method comprising:

a. positioning a tubular member in a first fluid-filled wellbore, said tubular member having a first end and a second end;

b. driving a generally cylindrical outer surface of a tubularly shaped piezoelectric element against an inner surface of the tubular member, said generally cylindrical outer surface of the tubularly shaped piezoelectric element being securely fastened to an inner surface of the tubular member;

c. exciting a standing wave in the tubular member, a first node of the standing wave being fixed by a first mass affixed to the first end of the tubular member and a second node of the standing wave being fixed by a second mass affixed to the second end of the tubular member, thereby emitting a high frequency, narrow band acoustic signal from the tubular member;

d. reflecting said high frequency, narrow band acoustic signal off an interface in a body of rock surrounding the first fluid-filled wellbore; and e. receiving the high frequency, narrow band acoustic signal at a plurality of seismic receivers.

13. A method of acquiring seismic data, as recited in claim 12, further comprising recording one phase shift at each of said plurality of seismic receivers.

14. A method of acquiring seismic data, as recited in claim 12, wherein the plurality of seismic receivers are positioned in a second fluid-filled wellbore.

15. A method of acquiring seismic data, as recited in claim 12, wherein the plurality of seismic receivers are positioned in the first fluid-filled wellbore.

16. A method of acquiring high resolution seismic data, as recited in claim 12, wherein the high frequency, narrow bandwidth acoustic signal emitted is a signal whose bandwidth is between approximately 5 Hz and approximately 50 Hz and whose frequency is centered between approximately 250 Hz and approximately 5 khz.

* * * * *